3,610,072
        POWER GEAR TRANSMISSION CONSTRUCTION
        Karl Grimpe, Duisburg, Germany, assignor to
                 Demag A.G., Duisburg, Germany
             Filed Oct. 22, 1969, Ser. No. 868,364
        Claims priority, application Germany, Nov. 25, 1968,
                        P 18 10 768.1
                   Int. Cl. F16h 1/28, 57/00
U.S. Cl. 74—801                                      6 Claims

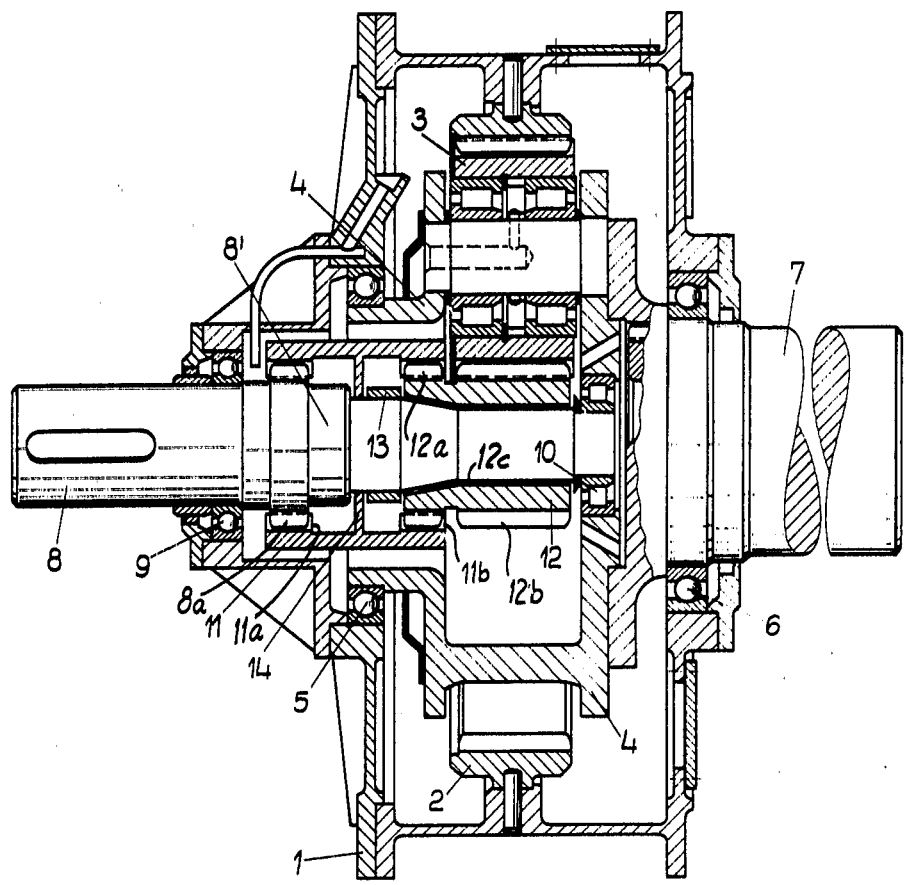

ABSTRACT OF THE DISCLOSURE

A power gear transmission construction includes a drive shaft which is positioned within a sun gear with radial play and which includes axially spaced bearings for rotatably supporting a planet gear carrier and planetary gears. A non-rotatable main gear with internal gear teeth is mounted around the planetary gears carried by the planet carrier and is in meshing engagement with the planetary gears. The arrangement includes a double joint clutch sleeve having a gear formation at one axial end in meshing engagement with a gear extension on the sun pinion and a gear portion at another axially extending end which is in meshing engagement with a gear defined on the drive shaft. The double clutch is mounted for some axial play and to permit universal movement of the drive shaft but is prevented from moving beyond a predetermined point by a shaft collar and a shaft bushing which are arranged in spaced location along the shaft axis. A secondary shaft is connected to the carrier for the planetary gears and is rotatably supported within the fixed housing mounting the main planet gear.

SUMMARY OF THE INVENTION

This invention relates in general to rotary power transmitting devices and in particular, to a new and useful short power branching transmission including planetary gearing and which includes a driving shaft rotatably supported by bearings before and behind the planet gearing and which rotatably supports and drivingly engages a self adjustable sun pinion of the gearing which is supported on the shaft for universal movement.

The invention relates to a power branching transmission, in particular, a planetary gear arrangement including a rotatably supported driving shaft at one end of the housing and a rotatably supported driven shaft extending outwardly from the opposite end of the housing. The driving shaft supports a sun pinion of the planetary gearing which meshes with at least two power branching gears or planet gears and which is mounted to permit load pressure compensation by self adjustment of at least one central gear.

It is known to mount a planet carrier which is in the form of a driven element by means of double suspension on the delivery side of the planetary gearing and to mount the driving shaft on the driving side of a transmission housing and in a manner such that it extends within the planet carrier. The sun pinion is usually connected fast with the driving shaft or the outer central gear of the system is connected through a double joint clutch with the transmission and is so designed that due to the elastic deformation of the outer gear ring wall a low pressure compensation is brought about upon self-adjustment of the outer central gear. Because of the unilateral double suspension of the driven member this planetary gear has a relatively great structural length. Its cost is relatively high because of the double joint connection between the outer large central gear and the gear housing. Much more disadvantageous than the matter of cost, however, is the fact that the arrangement is always subject to operation with impairment of the gear teeth faces, and, under the ever changing load pressure conditions between the mutually meshing gears, and because of the fast connection between the driving shaft and the sun pinion large masses must be accelerated the defects or faults are extended along the plane of origin to the point of compensation or equalization in the zone of the outer central gear.

The additional tooth defects which appear and the high masses which must be accelerated because of the meshing engagement of the planet gears with the sun pinion further influence the above conditions so that the only unilateral double suspension of the driven member provides a disadvantageous construction in respect to the chosen load pressure compensation by self adjustment of the central gear. Attempts have been made to provide for an unmounted self adjustment of the sun pinion. With the known embodiments, however, the driving shaft has not been suspended in the planetary gear but instead it is divided into a following joint clutch with a drive trunnion suspension, or it is divided into a unilaterally doubly suspended driving shaft with a joint sleeve to which the sun pinion is articulated. Such a construction presents trunnions on both sides, one being a carrier of the clutch part of the joint and the other being mounted on the delivery side in a unilaterally doubly suspended planet carrier with the aid of a gear tooth system. With such systems, because of the unilateral suspension of the driving shaft and of the driven member, the structural length becomes relatively great but even so the bearing distance is still not as wide as desired.

In accordance with the present invention, a transmission is provided which includes a structural length as short as possible while maintaining a relatively great bearing distance for the driving shaft. In addition, the driven gear in the form of planetary gears is mounted with the greatest possible bearing spacing in the transmission and the sun pinion is mounted for universal pivotal movement with the driving shaft and is arranged to be self adjusting. In accordance with the invention, the drive shaft extends through a hollow sun pinion with radial play and is mounted by bearings both before and behind the surrounding power branching gears of the planetary wheels. The sun pinion is connected with the driving shaft for same axial and universal movement through a double joint clutch. The driving shaft is then torque free from the region of its clutch engagement with the double joint of the clutch to the bearing point behind the planet gear set.

Preferably, the driving shaft is mounted before the planetary gear set in the gear housing and behind the power branching planet gears arranged within the housing and behind the planetary gear which is connected to the output shaft.

Accordingly, it is an object of the invention to provide a power transmission which includes a driving shaft which is arranged within a hollow sun gear with radial play and which is mounted on spaced bearings arranged outside of a planetary gear carrier, and with a plurality of planetary gears engaged with the sun gear, and wherein the sun gear is universally mounted with the shaft and is driven by the shaft through a double joint clutch element which surrounds a portion of the shaft and a portion of the sun gear.

A further object of the invention is to provide a power transmission which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The only figure of the drawing is an axial sectional view of a power transmission constructed in accordance with the invention.

GENERAL DESCRIPTION OF THE PREFERRED EMBODIMENT

Referring to the drawings in particular the invention embodied therein comprises a stationary gear housing 1 which supports a central internal large diameter gear 2 in a fixed non-rotatable position. The housing carries axially spaced bearing sets 5 and 6 respectively, for rotatably supporting a secondary shaft 7 and a planet gear carrier 4 which contains a plurality of planet gears 3 which are in meshing engagement with the fixed internal gear 2.

In accordance with the invention, a driving shaft or drive shaft 8 is rotatably supported by the bearing 9 on one end of the planetary carrier 4 and by a bearing 10 which is arranged adjacent the other end. A clutch sleeve 11 of the double joint type extends around the shaft 8 and it includes a gear portion 11a which drivingly engages with a gear portion 8a of the shaft adjacent the bearing 9. The opposite end of the clutch sleeve 11 includes a gear portion 11b which drivingly engages a gear portion 12a of a sun pinion 12. The sun pinion 12 is mounted around the shaft 8 with radial play and it is provided with a gear toothed portion 12b which is in meshing engagement with the planetary gears 3. The drive shaft 8 is provided with a shaft collar 8' and a bushing or collar 13 at an axially spaced location from the collar 8'. The shaft 8 is also tapered at the location of its entrance into the sun gear bore 12c and it includes an end portion of lesser diameter which is rotatably supported in the end bearing 10.

The double clutch 11 embraces the drive shaft 8 with radial play and it is limited in its axial movement relative to the drive shaft 8 by a radial web formation 14 thereof which is disposed between the collar 8' and a collar or bushing 13 and it is prevented from moving beyond these locations. Collar 13 is preferably a shrunk on bushing. The bushing 13 also provides a limitation for the axial movement of the hollow sun pinion 12.

The clutch sleeve 11 and the sun pinion 12 are freely movable relative to each other and relative to the shaft collar which does not impair the mobility of the clutch connection between the sun pinion and the driving shaft 8. This transmission is suitable for any type of gear system either straight helical or herring bone, for example.

What is claimed is:

1. A power transmission comprising a fixed housing having an internal gear therein mounted in a fixed non-rotatable position, a driven shaft having a planetary gear carrier adjacent said internal gear and being rotatably supported in said housing, a drive shaft having an end extending into said housing from the opposite side thereof from said driven shaft, a sun gear arranged around said drive shaft with radial play in respect to said drive shaft, at least one planetary gear engaged with said sun gear and said internal gear and rotatably supported by said planetary gear carrier, first and second axially spaced bearing means rotatably supporting said drive shaft on respective sides of said planetary gears, and a double clutch sleeve around said drive shaft having gear means drivingly engaged with said drive shaft and with said sun gear and being mounted for some radial and axial movement on said drive shaft and being located between said first bearing means and said sun gear.

2. A power transmission, according to claim 1, wherein said first bearing means rotatably support said drive shaft in said housing at a location on one side of said planetary gear carrier and said second bearing means rotatably support said drive shaft at a location adjacent the opopsite side of said planetary gear carrier.

3. A power transmission, according to claim 1, wherein said second bearing means rotatably supports the end of said drive shaft within said housing and also rotatably support said driven shaft with said planetary gear carrier at the side thereof remote from said clutch sleeve.

4. A power transmission, according to claim 1, wherein said drive shaft has first and second axially spaced collars, said clutch sleeve having an intermediate partition disposed between said collars and limiting the axial movement of said clutch sleeve.

5. A power transmission, according to claim 4, wherein one of said collars is adjacent said clutch sleeve and beyond one end of said sun gear and limiting the movement of said sun gear toward this end.

6. Power-branching transmission, comprising a planetary gearing including a sun pinion, a fixed central gear and a sun pinion drive shaft, bearing means for the double-suspension of said drive shaft, a double joint drive clutch member engaged between said shaft and said sun pinion, at least two gears of said planetary gearing comprising power-branching gears, said driving shaft being rotatably supported by said bearing means before and behind said planetary gearing and traversing with radial play said sun pinion, said sun pinion being hollow and being connected with said drving shaft by said double joint clutch in a manner permitting universal motion of said sun pinion.

References Cited

UNITED STATES PATENTS

| 1,495,238 | 5/1924 | Anglada | 74—801 |
| 2,591,743 | 4/1952 | Thompson | 74—801 |
| 2,703,021 | 3/1955 | Stoeckicht | 74—801 X |
| 3,221,832 | 12/1965 | Holmstrom | 74—801 X |
| 3,425,301 | 2/1969 | Shannon | 74—801 |

ARTHUR T. McKEON, Primary Examiner

U.S. Cl. X.R.

74—410